United States Patent
Guimbal

(10) Patent No.: US 7,040,863 B2
(45) Date of Patent: May 9, 2006

(54) VARIABLE PITCH ROTOR BLADE FOR SHROUDED ROTORS, IN PARTICULAR HELICOPTER ROTORS

(75) Inventor: Bruno Guimbal, Aix les Milles (FR)

(73) Assignee: Eurocopter, Marignane Cedex (FR)

( * ) Notice: Subject to any disclaimer, the term of this patent is extended or adjusted under 35 U.S.C. 154(b) by 96 days.

(21) Appl. No.: 10/860,745

(22) Filed: Jun. 4, 2004

(65) Prior Publication Data

US 2004/0247436 A1     Dec. 9, 2004

(30) Foreign Application Priority Data

Jun. 5, 2003 (FR) ................... 03 06792

(51) Int. Cl.
*B64C 11/20* (2006.01)

(52) U.S. Cl. .................. 416/134 A; 416/138; 416/141; 416/229 R

(58) Field of Classification Search ............ 416/134 A, 416/141, 138, 229 R, 230, 241 A
See application file for complete search history.

(56) References Cited

U.S. PATENT DOCUMENTS

| | | | | |
|---|---|---|---|---|
| 3,161,238 A | * | 12/1964 | Key | ............ 416/226 |
| 4,305,699 A | * | 12/1981 | Martinelli | ........... 416/226 |
| 4,306,837 A | * | 12/1981 | Brogdon et al. | ........ 416/134 A |
| 4,892,462 A | * | 1/1990 | Barbier et al. | ............. 416/226 |
| 5,042,968 A | * | 8/1991 | Fecto | .......................... 416/226 |
| 5,454,693 A | * | 10/1995 | Aubry et al. | ........... 416/134 A |
| 5,462,408 A | * | 10/1995 | Coffy | ..................... 416/134 A |
| 5,527,155 A | * | 6/1996 | Chen et al. | ................. 416/226 |
| 2002/0164251 A1 | | 11/2002 | Sehgal et al. | |

FOREIGN PATENT DOCUMENTS

| | | |
|---|---|---|
| FR | 2 285 298 | 4/1976 |
| FR | 2 430 354 | 2/1980 |
| FR | 2 699 498 | 6/1994 |
| FR | 2 699 499 | 6/1994 |

\* cited by examiner

*Primary Examiner*—Edward K. Look
*Assistant Examiner*—Nathan Wiehe
(74) *Attorney, Agent, or Firm*—Young & Thompson

(57) ABSTRACT

The blade includes a current part (1) having an aerodynamic profile enclosing a spar (7) and extending from blade tip (4) to a blade root (3) provided with a pitch sleeve (21), through which twisting arm (6) passes and protrudes beyond blade root (3), and having a first part of a bundle (5) of superimposed and elongated metal strips, current part (1) including a block (13) based on synthetic material molded in form in a single piece around spar (7), and a second part of bundle (5) extending in line with the first part forming the twisting arm (6) and cooperating with the anchoring devices (14, 17) of the block (13) based on synthetic material around the spar (7).

18 Claims, 1 Drawing Sheet

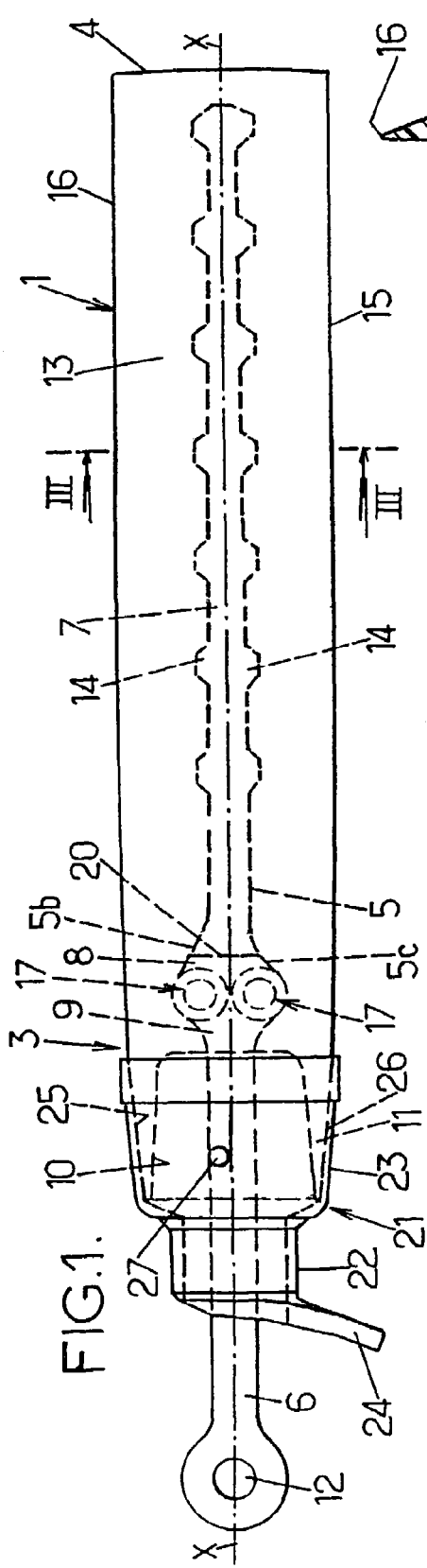
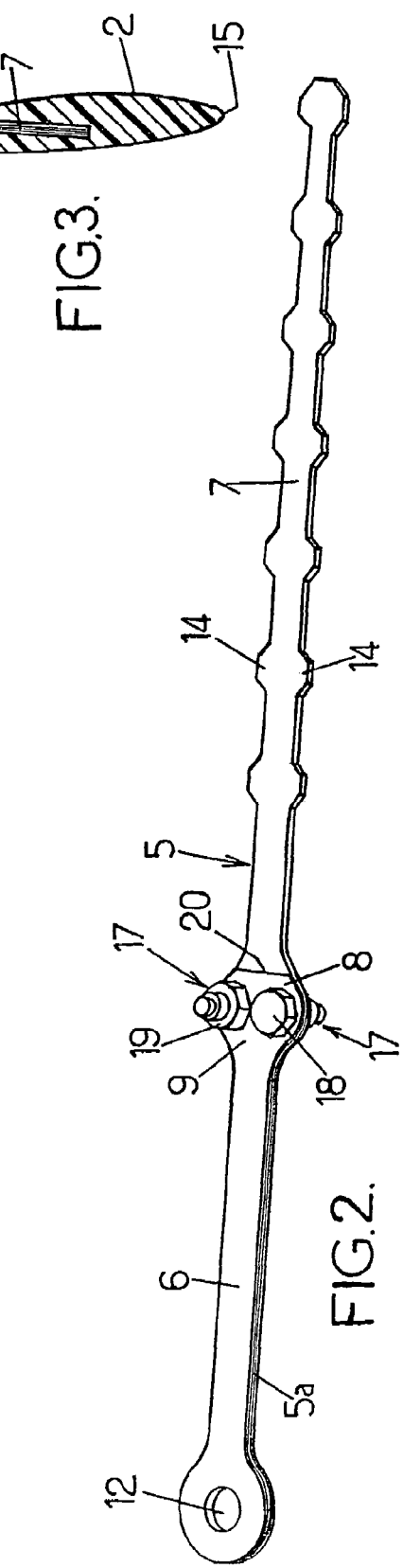

US 7,040,863 B2

VARIABLE PITCH ROTOR BLADE FOR SHROUDED ROTORS, IN PARTICULAR HELICOPTER ROTORS

FIELD OF THE INVENTION

The invention concerns a variable pitch rotor blade intended more specifically, although not exclusively, for mounting on a rotorcraft multi-blade, variable pitch shrouded rotor, in particular a helicopter, of the type known as a "fenestron" (trademark), in which the multi-blade rotor is mounted in an opening made in a profiled shroud in the rear of the helicopter tail beam, as are equipped many helicopter models in the low and medium tonnage helicopter range produced and marketed by the Applicant.

More specifically, the invention concerns an individually removable and interchangeable blade for a multi-blade shrouded rotor of the aforementioned type, the blade comprising a current vaned part with an aerodynamic profile produced from a synthetic material base, enclosing a spar extending approximately along a longitudinal blade pitch change axis, said current part extending, depending on the span of the blade, between one blade tip and one blade root, at least partly tubular, with a pitch sleeve, integral with the blade rotating about said pitch axis and having two pitch rotating journals offset according to the pitch axis, and a pitch control lever protruding toward the outside of said sleeve, said blade root being traversed more or less along the pitch axis by an twisting arm about said pitch axis, and protruding beyond the blade root on the side opposite the blade tip, and of which one end is integral with said blade root rotating about said pitch axis, and the opposed free end is designed for attachment to a rotor hub.

BACKROUND OF THE INVENTION

In a known embodiment, the hub of a rotor of the aforementioned type has, for each blade, two coaxial rotation bearings, which are radially offset with respect to the rotation axis of the hub, and in each of which the blade is mounted to swivel in pitch by respectively one of the two rotation journals about its pitch sleeve, whose pitch control lever free end is articulated, generally with a swivel end, on one of the arms of a plate named "spider" of a collective blade pitch control device of the multi-blade shrouded rotor, according to a well-known structure to the man of the trade.

The first multi-blade variable pitch shrouded rotors known as "fenestrons", mounted on the "Gazelle" and "Dauphin" helicopters produced by the Applicant included stamped light alloy blades attached by screws, each to one of the twisting arms, around the pitch axis of the corresponding blade, of a single star bundle, comprising a stack of a number of metal plates cut into stars having as many arms as the rotor has blades, with the arms extending radially to protrude outside a central ring attached to the hub, so that the superimposition of the corresponding arms of the star cut-out plates produces as many twisting arms as the rotor has blades, to allow the collective control of said rotor blades.

A quest for lower manufacturing costs and easier maintenance of these rotors resulted in the development of other methods, more particularly using Kevlar (trademark) "Stratifils" bundles to form twisting arms, individual or forming stars (by crossing the "Stratifils" for an even number of rotor blades) and molding the current part of the blades of a synthetic matrix composite material on part of the Kevlar bundle specific to each blade, and which forms its longitudinal section.

In an embodiment like this, implemented in production on some helicopters by the Applicant, the link between the current part of each blade and the Kevlar bundle corresponding to it is tough and reliable as long as major precautions are taken. However, the use of Kevlar and the protection of the composite material from erosion mean that the method is costly.

A proposition has also been made to produce the current part of the blade by the injection molding of a synthetic matrix composite material of thermoplastic (polyamide) reinforced with fiberglass reinforcing fibers around the part, forming the spar of the blade, with a Kevlar bundle also forming the corresponding twisting arm. But this embodiment, designed to cut costs considerably, was dropped after tests revealed that it was impossible to anchor the current part of the blade solidly to the part forming the spar of the twisting bundle.

The recent development of light helicopters equipped with a multi-blade shrouded rotor of this type went hand in hand with return to the use of matrix metal blades, each bolted to an individual twisting arm, with some developments over the matrix light alloy blades encountered in the first shrouded rotors of this type.

To reduce the twisting stiffness, the twisting arms comprise a bundle of elongated and stacked strips, cut out of stainless steel sheet and thinner compared to the first twisting bundles. Finally, for equipment on very light helicopters, since the use of individual twisting bundles, less costly to produce, resulted in a twisting lengths too low, because of the small diameter of the corresponding multi-blade rotor, it became necessary to return to a solution using a twisting arm star bundle, in equal number to the blades of the rotor.

These high performance and reliable embodiments have the drawback of being heavy and costly.

Furthermore, on the very light "Cabri" helicopter demonstrator from the French company Guimbal, a multi-blade variable pitch shrouded rotor is pro posed with composite blades, molded on an external radial part (compared to the axis of rotation of the rotor) with Kevlar (trademark) star twisting arms attached through the central part to the rotor hub. The latter has demonstrated outstanding performance, impressive lightness and a good margin of resistance to overspeed but, however, the method cannot be adapted to series production because the replacement of a single blade is impossible and erosion protection is very difficult to obtain, while production run costs is very high.

SUMMARY OF THE INVENTION

The purpose of this invention is to propose a blade with a simple and economical structure cutting costs and weight of a multi-blade variable pitch shrouded rotor equipped with blades like this, without reducing performance.

More particularly, the invention proposes lighter blades that are cheaper to produce and more reliable than those currently available, and that may, in addition, be mounted as a retrofit to the existing hubs of variable pitch multi-blade shrouded rotors of the aforementioned types, to replace the blades currently fitted to these rotors. In particular, the blade according to this invention must be individually interchangeable.

To this end, the invention proposes a rotor blade of the type shown above, characterized in that the twisting arm comprises a first part consisting of a bundle of metal strips superimposed and elongated along the pitch axis, and said current part including a block based on said synthetic material, molded in form in a single piece around said spar, including a second part of said metal strip bundle, extending in an extension to said first part forming the twisting arm, and cooperating with the anchorage devices of said block based on synthetic material around said second part of the strips bundle.

To ensure attachment of the basic block of synthetic material molded in form in a single piece, and by injection around the spar being sufficiently redundant, for this injected block not to be critical, it is particularly advantageous for the anchoring devices to include at least one clamping device of said strips of bundle against one another, said clamping device being embedded in said block based on synthetic material, approximately in the zone of said blade root.

Advantageously, in a simple but efficient structure, said clamping device is the clamping bolt of the said strips of the bundle, said bolt including a screw with a head and a threaded rod passing through the strips of the bundle, in the direction of the thickness, and secured in a nut, in such a way as to enclose said strips between the nut and the head of the screw, preferably with an interposed washer between the head of the screw and the bundle and/or a washer between the nut and the bundle of strips.

According to the arrangement that has proved to be most advantageous, more particularly because it eliminates all risks of rotation and bulking of the strips together, at the recess into the blade root, whose manufacturing it facilitates, by holding the bundle of strips tight and aligned on molding, and reducing the risk of settling, in the most massive part of the block of synthetic material, the anchorage devices include two attaching bolts arranged head-to-tail either side of said pitch axis, whose screws have axes more or less parallel and centered in the same plane, more or less perpendicular to the pitch axis, approximately in the blade root.

In addition, the clamping devices may advantageously include teeth protruding into the strips in the second part of the bundle, forming said spar.

To prevent filling faults during molding, the teeth may advantageously be set out along the spar, span-wise, and provided in at least one side of the strips of the second part of the bundle, protruding towards the leading and/or trailing edge of the blade.

It will be seen that the cooperation of the attaching bolts embedded in the blade root and the teeth provided in the second part of the bundle will result in the two bolts correcting the distribution of forces between the teeth, which otherwise might be inconsistent.

Also advantageously, to optimize the cost of the strips according to the forces tolerated by its components, the first part of the bundle of strips forming said twisting arm may include a number of strips exceeding the number of strips in the second part of the bundle that said spar comprises.

More particularly, at one end of the bundle at least, in the direction of the strip stack, at least one strip is truncated approximately in the blade root zone.

In one preferred embodiment of the invention, at least one strip at each end of the bundle, in the direction of the stack of strips, is truncated near a portion of said bundle which is embedded approximately in said blade root, between said first and second parts of said bundle and in which the strips are clamped against one another by at least one clamping device.

The sizing of the strips around the clamping devices, and more particularly around the two aforementioned clamping bolts, means that advantageously, in said portion of the bundle extending between the first and second parts of the bundle, the strips are widened and connected to at least one of said first and second parts of the bundle, respectively on the side of the twisting arm and the spar, by rounded edges of different shapes on the trailing edge side and leading edge side of the blade, to allow polarization when reconstructing the bundle after action might have been carried out on one or several isolated strips.

To improve the attachment of the block based on synthetic material to the blade spar, this block molded in a single piece is advantageously made by injection of a matrix composite material comprising said synthetic material reinforced with reinforcing fibers, in particular short carbon fibers.

According to the invention, the synthetic matrix is advantageously a thermoplastic, preferably an aromatic superpolyamide, filled with approximately 40% by weight of carbon fibers.

In addition, the pitch sleeve, machined of light alloy, advantageously has an internal truncated journal diverging out toward the blade tip, and through which the sleeve is bonded between an outer truncated face of a tubular part of one end of said block molded in the form of the blade, at the root of that blade. On a blade sleeve like this, fitted by conical bonding onto the block of composite material in the current part of the blade, after molding, at least one of the two pitch journals of the pitch sleeve, and preferably each of them, is hardened by a deposit of alumina-titanium plasma.

Finally, concerning the link between the twisting arm of each blade to the hub of the rotor in question, this twisting arm, at its free end, advantageously includes an attaching eyelet, passing through the bundle of strips in the direction of its thickness, and designed as an opening for a bolt securing the twisting arm to the rotor hub.

BREIF DESCRIPTION OF THE DRAWINGS

Other advantages and characteristics of the invention will be disclosed in the description given below, in a non-limitative manner, of a typical embodiment described with reference to the attached illustrations in which:

FIG. 1 is a plan view of a blade according to the invention, designed to be fitted to a helicopter variable pitch multi-blade shrouded rotor, FIG. 2 is a perspective view of the metal strip bundle equipping the blade shown in FIG. 1, of which the bundle is more particularly the twisting arm and the spar, and FIG. 3 is a transversal sectional view along III—III of FIG. 1, representing in particular the aerodynamic profile of the blade as defined by the block of composite material in its current part around the spar.

DETAILED DESCRIPTION OF THE INVENTION

The variable pitch rotor blade of FIG. 1 includes essentially a current vaned part 1, having an aerodynamic profile and which, at the level of section III—III of FIG. 1, profile 2 of the blade section of FIG. 3, extending, according to the span of the blade between a blade root 3 and a blade tip 4, and a bundle 5 of elongated metal strips 5a (shown only in the left-hand part of FIG. 2 for easier reading), approximately with the same shapes and sizes, which are superimposed according to a joined stack as shown in FIG. 2, the bundle 5 extending along the longitudinal axis X—X of the pitch change of the blade.

Bundle 5 in FIG. 2 consists of a stack of strips 5a of stainless steel sheet having the same thickness, for instance each having a thickness of 0.2 mm, in numbers varying according to the size of the blade and therefore the diameter of the rotor, between the order of eight and the order of twenty strips. For instance, to equip the anti-torque shrouded rotor on a very light helicopter, bundle 5 may include ten strips 5a.

Bundle 5 includes essentially two parts, of unequal lengths, extending one another along the pitch axis X—X of the blade, and separately from one another by a bundle 5 portion in which strips 5a are widened (perpendicularity along the pitch axis X—X and in the strip plane). Accordingly, bundle 5 has a first part, with a shorter axial length, more or less rectilinear (on the left of FIGS. 1 and 2) forming a twisting arm 6 around the pitch axis X—X, which protrudes out of the current part 1 of the blade, transversing axially the blade root 3, partly tubular, and bundle 5 has a second toothed part with a longer axial length, embedded in the current part 1 and forming blade spar 7, extending into current part 1 along the pitch axis X—X. Along bundle 5, twisting arm 6 and spar 7 are separated from one another by bundle portion 8 in which strips 5a are widened, and which is directly adjacent to axial end 9 (according to the axis X—X) of twisting arm 6 which is recessed, like the bundle portion 8, in the area of blade root 3 zone, at the bottom of recess 10 in its tubular part 11.

At the other axial end of twisting arm 6, which is a free end outside of current part 1 and blade root 3, a twisting arm 6 has an attaching eyelet 12, generally cylindrical in shape, contained within the extension of circular drilled holes more or less coaxial and of the same diameter formed in the free rounded and superimposed ends of strips 5a of bundle 5, so that eyelet 12 passes through bundle 5 of strips according to its thickness and is intended to accommodate an attaching bolt securing this end of twisting arm 6 to the corresponding rotor hub, whereas by its other end 9, inset into blade root 3, and by the widened portion 8 of bundle 5, twisting bundle 6 is made integral in rotation with blade root 3, with current part 1, around the blade pitch axis X—X.

The current part 1 and tubular part 11, extending at blade root 3, comprise a single block 13 of shaped molded composite material produced in one piece by injection around spar 7 and widened portion 8 and adjacent end 9 of twisting arm 6. The composite material molded in this way in one piece by injection into a single block 13 is a composite matrix material of thermoplastic synthetic material reinforced with reinforcing fibers that are short carbon fibers.

Advantageously, the thermoplastic matrix is an aromatic superpolyamide filled to approximately 40% by weight with carbon fibers.

A composite material such as this has a Young's modulus of 31,000 MPa, tensile strength at 23° C. of 260 MPa, a maximum temperature of around 80° C. and water absorption of approximately 1.3% and costs approximately 20% the price of a P.E.E.K. (polyether-ether-cetone) matrix composite reinforced with short carbon fibers, making it advantageous for this application.

To ensure particularly strong attachment of block 13 of reinforced thermoplastic on the parts presented above in bundle 5 of strips 5a around which block 13 was injected, in particular for good attachment between block 13 and spar 7, the latter has anchoring devices, consisting of teeth 14, protruding into the strips 5a forming spar 7. These teeth 14 are, for instance, machined into the two sides of the strips of spar 7 in order to protrude, in the strips plane, on one side toward leading edge 15 and on the other to trailing edge 16 of the blade. Teeth 14 are set out along spar 7 according to its span, either as pairs of teeth 14 opposed at some points along a length of spar 7 (as shown in FIG. 1), or alternating or offset, according to the span.

The shape of teeth 14 shown in FIG. 1, more or less trapezoidal with small base toward the outside and with teeth 14 forming pairs of opposing teeth, is a relatively simple geometrical configuration avoiding filling faults in the mold when the block of composite 13 is injected, but offering good attachment.

However, to correct the poor distribution of forces between teeth 14, strips 5a of bundle 5 are clamped against one another in the portion 8 of the bundle in which the strips are widened, and which is more or less embedded in the area of blade root 3, by two clamping bolts 17, each including one screw 18 with a head and one nut 19, and that are mounted head-to-tail (see FIG. 2) either side of the pitch axis X—X (see FIG. 1) so that the axes of the threaded rods of screws 18, passing through the stack of strips 5a in the direction of the thickness of bundle 5, are parallel to one another and perpendicular to the pitch axis X—X, in a plane perpendicular to this axis X—X more or less at the blade root 3. Each bolt 17 also includes, preferably, two washers (not shown in FIG. 2), one being interposed between nut 19 and the strips of bundle 5, and the other between screw 18 head and the strips of bundle 5, said strips 5a being clamped against one another by the screwing and tightening of nut 19 on screw stems 18.

These two bolts 17, embedded on block 13 of composite, approximately at the blade root 3, also form anchoring devices which, simultaneously, eliminate any risk of strips 5a rotating and bulking with respect to one another, at the inset into blade root 3, and facilitate the manufacturing of the blade by holding the strips of bundle 5 tight and aligned when molding.

These bolts 17 are anchoring devices which not only correct the poor distribution of forces between teeth 14, but also reduce the risk of settling in the more massive part of composite block 13 to obtain, by the working together of these two bolts 17 and teeth 14, sufficiently redundant attachment between block 13 and strips 5a bundle 5 so that block 13 of injected composite is not critical.

To optimize the cost of bundle 5 of strips 5a according to the forces, the first part of bundle 5 forming twisting arm 6 may include a higher number of strips 5a than the number of strips in the second part of bundle 5 forming spar 7.

In a simple manner, this result is obtained by transversally truncating at least one strip 5a, and preferably two adjacent strips, on each of the two outer faces of the stack of strips 5a, i.e. in the direction of the thickness of bundle 5, and the truncation line 20 of these two strips is shown in FIGS. 1 and 2, extending transversally, more or less in the zone of blade root 3, between the end of spar 7 and the adjacent portion 8 of the bundle, where the strips are widened and clamped together by two clamping bolts 17, or any other equivalent clamping device of the strips of bundle 5.

We also take advantage of portion 8 of the bundle in which the strips are widened to ensure polarization for the reconstruction of bundle 5 after possible action on one or several isolated strips 5a, taking steps to ensure that this widened portion 8 of bundle 5 is connected to the adjacent parts, on the side of twisting arm 6 or, as shown in FIG. 1, on the side of spar 7, by rounded edges 5b and 5c of strips 5a having different shapes and a steeper slope on side 5c of the leading edge 15 than on side 5b of the trailing edge 16 of the blade, so that bundle 5 is not exactly symmetrical with respect to its central axis, which is the pitch axis X—X.

In a known manner, the blade structure is completed, at its root 3, by a pitch sleeve 21, consisting of machined light alloy, and having two pitch rotating journals, on the outside face, offset according to the pitch axis X—X, and one of which is a cylindrical journal 22 on the side of attaching eyelet 12, and the other a truncated journal 23 diverging toward blade tip 4, and whose diameter is always greater than that of cylindrical journal 22. At the end of the latter, turned toward attaching eyelet 12, pitch sleeve 21 also has a pitch control lever 24, protruding towards the outside of sleeve 21 and inclined slightly toward attaching eyelet 12.

After injection molding of composite block 13, pitch sleeve 21 is fitted by bonding with an internal radial and truncated journal 25, inside truncated rotation journal 23, against a radial external truncated face 26 of tubular part 11 of blade root 3, with a rivet, shown schematically as 27 in FIG. 1, also attaching, for safety's sake, pitch sleeve 21 to tubular part 11 at the molded end of block 13, at blade root 3. In addition, a hard deposit ensures the hardening of the two pitch journals 22 and 23 of sleeve 21.

Note that through the recess 10 in tubular part 11 of block 13 at blade root 3, and thanks to pitch sleeve 21, it is possible to obtain a free part of the bundle 5 of strips forming a twisting arm 6 of sufficient length, equal at least to what it would be with a twisting star arm bundle on each of which a blade is bolted.

Other advantages are obtained from injection molding composite block 13 around the parts of the bundle 5 of strips whereby the blade may be marked by molding its batch number into it, ensuring traceability, and a water drain hole can be obtained, also by molding.

An advantage of such a strip, with an individual twisting arm 6, is that bundle 5 forming it will allow axial fiber lay-up. The presence of two clamping bolts 17, in portion 8 of the bundle inset into blade root 3, produces an acceptable distribution of forces, with peening pressure between steel strips 5a of bundle 5 and the composite of block 13 not exceeding approximately one-third the specified strength of the composite material.

In addition, for individually removable blades like this, with their twisting arms 6, the density of the current vaned part 1, approximately half that encountered on similar die stamped aluminum alloy blades, halves the flat return tendency, which reduces or even cancels out the weight and dimensions of balance weights (not shown) that may be mounted on such blades.

In addition, the reduction of centrifugal force, resulting from the reduced density of current part 1, estimated at approximately 40%, reduces the number of strips 5a of bundle 5 compared to metal blades bolted onto twisting arms with stacked metal strips.

Finally, blades according to the invention, made of injected thermoplastic, have a fail-safe character enabling them to fly with deep cuts in them, while blade repair by local retouching is easy and does not cause problems of anti-corrosion protection.

The structure of the blade described above and its advantages as described here mean that a variable pitch blade can be obtained for a shrouded helicopter rotor, with weight and cost reduced compared to known similar blades, while offering equally good performance.

The invention claimed is:

1. Variable pitch rotor blade, for a rotorcraft multi-blade, variable pitch shrouded rotor, with the blade comprising a vaned current part (1), having an aerodynamic profile (2) produced on the basis of synthetic material enclosing a spar (7) extending more or less along a longitudinal axis (X—X) for blade pitch change, said current part (1) extending according to the blade span between a blade tip (4) and a blade root (3), at least partly tubular, with a pitch sleeve (21) integral with the blade in rotation around said pitch axis (X—X), and having two pitch rotation journals (22, 23) offset according to the pitch axis (X—X), and a pitch control lever (24) protruding toward the outside of said sleeve (21), with said blade root (3) transversed more or less along the pitch axis (X—X) by an arm (6) twisting around said pitch axis (X—X) and protruding beyond blade root (3) on the opposite side to blade tip (4), and of which one end (9) is integral with said blade root (3) in rotation around said pitch axis (X—X), and the opposed free end (12) is designed to be attached to a rotor hub, characterized in that said twisting arm (6) comprises a first part of bundle (5) of metal strips (5a) superimposed and extending along said pitch axis (X—X), and said current part (1) including a block (13) based on said synthetic material molded in form in a single piece around said spar (7), comprising a second part, of said bundle (5) of metal strips (5a) extending in an extension to said first part, forming the twisting arm (6), and cooperating with anchoring devices (14, 17) of said block (13) based on synthetic material around said second part of bundle (5) of strips (5a).

2. A blade according to claim 1, characterized in that said anchoring devices (14, 17) include at least one clamping device (17) securing said strips (5a) of bundle (5) against one another, said claming device (17) being embedded in said block (13) based on synthetic material, more or less in the area of said blade root (3).

3. A blade according to claim 2, characterized in that said clamping device is a bolt (17) clamping strips (5a) of said bundle (5), said bolt (17) including a screw (18) with a head and a threaded rod passing through strips (5a) of bundle (5) according to the thickness of the latter, and that is screwed into a nut (19) to enclose said strips (5a) between nut (19) and the head of screw (18), preferably with an interposed washer between head of screw (18) and bundle (5) and/or a washer between nut (19) and the bundle (5) of strips.

4. A blade according to claim 3, characterized in that the anchoring devices include two attaching bolts (17) arranged head-to-tail and either side of said pitch axis (X—X), and whose screws (18) have axes more or less parallel and centered in a same plane more or less perpendicular to the pitch axis (X—X), approximately in the blade root.

5. A blade according to claim 1, characterized in that said anchoring devices include teeth (14) protruding into strips (5a) in the second part of bundle (5).

6. A blade according to claim 5 characterized in that said teeth (14) are set out along the spar (7) across its span, and arranged in at least one side of strips (5a) of the second part of bundle (5) and protruding toward the leading edge (15) and/or trailing edge (16) of the blade.

7. A blade according to claim 1, characterized in that the first part of bundle (5) of strips (5a) forming said twisting arm (6) includes a higher number of strips (5a) than the number of strips in the second part of the bundle (5) included in said spar (7).

8. A blade according to claim 2, characterized in that, at least at one end of bundle (5) in the direction of the stack of strips (5a), at least one strip (5a) is truncated (20), more or less in the area of blade root (3).

9. A blade according to claim 8, characterized in that at least one strip (5a) at each end of bundle (5) in the direction of the stack of strips (5a) is truncated (20) near a portion (8)

of said bundle (5) which is embedded approximately in the blade root (3), between said first and second parts of said bundle (5), and in which strips (5*a*) are clamped against one another by at least one clamping device (17).

10. A blade according to claim 9, characterized in that in said portion (8) of bundle (5), strips (5*a*) are widened and connected to at least one of said first and second parts of bundle (5) respectively on the side of twisting arm (6) and spar (7) by rounded edges (5*b*, 5*c*) having different shapes on the trailing edge side (16) and leading edge side (15) of the blade to allow polarization when reconstructing said bundle (5) after action on at least one isolated strip (5*a*).

11. A blade according to claim 1, characterized in that said block (13) molded in form in one piece is made of a composite matrix material forming with said synthetic material reinforced with fibers.

12. A blade according to claim 11, characterized in that said synthetic matrix is a thermoplastic material.

13. A blade according to claim 12, characterized in that said thermoplastic material is an aromatic superpolyamide, filled with approximately 40% by weight of carbon fiber.

14. A blade according to claim 1, characterized in that said pitch sleeve (21) is machined from light alloy and has a truncated internal journal (25) diverging toward blade tip (4), and through which sleeve (21) is bonded between a truncated outer face (26), of a tubular part (11) of one end of said block (13) molded in form of the blade, at the blade root (3).

15. A blade according to claim 1, characterized in that at least one of the two pitch journals (22, 23) of pitch sleeve (21) is hardened by a hard deposit.

16. A blade according to claim 1, characterized in that, at its free end, twisting arm (6) has an attaching eyelet (12) passing through the bundle (5) of strips (5*a*) according to its thickness, designed to accommodate a bolt securing twisting arm (6) to the rotor hub.

17. A blade according to claim 1, characterized in that, at least at one end of bundle (5) in the direction of the stack of strips (5*a*), at least one strip (5*a*) is truncated (20), more or less in the area of blade root (3).

18. A blade according to claim 11 wherein the fibers are short carbon fibers.

\* \* \* \* \*